May 18, 1937.  T. SQUASSONI  2,080,794
HOLDER FOR FISHHOOKS
Filed Jan. 7, 1936
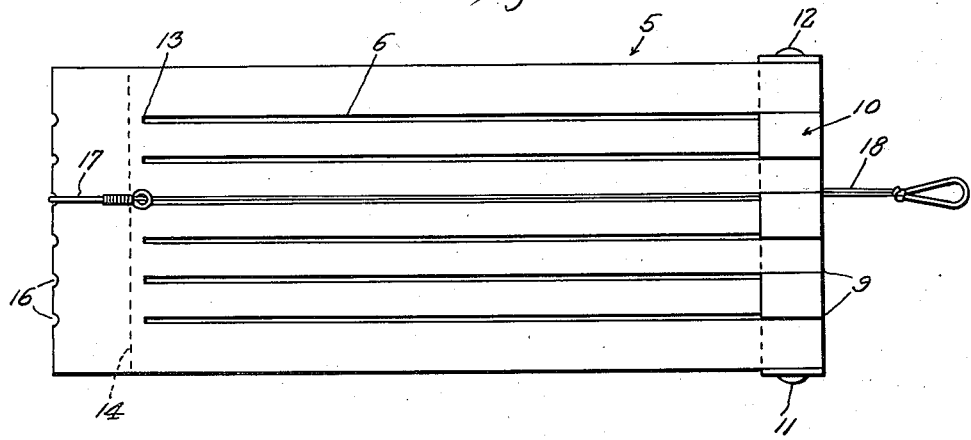
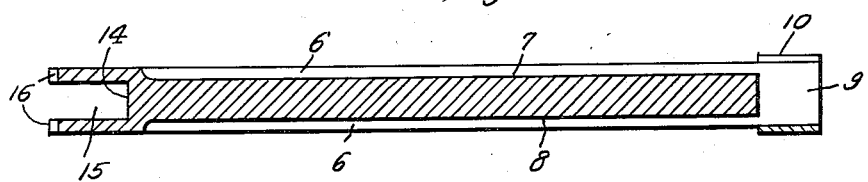
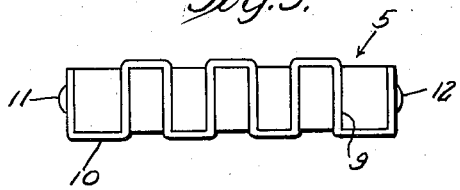
Inventor
Tullio Squassoni,
By Clarence A. O'Brien and
Hyman Berman
Attorneys Patented May 18, 1937

2,080,794

UNITED STATES PATENT OFFICE 2,080,794

HOLDER FOR FISH HOOKS

Tullio Squassoni, Norwich, N. Y.

Application January 7, 1936, Serial No. 58,009

8 Claims. (Cl. 43—31)

My invention relates generally to means for holding fish hooks, and particularly to a holder for conveniently mounting the hooks to enable safely and conveniently carrying the same ready for application to a fishing line, and an important object of the invention is to provide a holder of the character indicated which keeps the gut leaders of the hooks properly stretched and prevents their becoming coiled and tangled, and which securely guards the points of the hooks.

Another important object of the invention is to provide an extremely low cost and compact arrangement of the character indicated above which can be suitably made from a variety of inexpensive materials.

Other important objects of the invention will be apparent from a reading of the following description in connection with the drawing, wherein for purposes of illustration I have shown a preferred embodiment of my invention.

In the drawing:—

Figure 1 is a plan view of an embodiment of my invention showing a gut leader equipped hook mounted thereon.

Figure 2 is a longitudinal vertical sectional view taken through Figure 1.

Figure 3 is an end elevational view of Figure 1 taken from right to left with the leader omitted.

Referring in detail to the drawing, the numeral 5 generally designates the body of the device which may be suitably composed of wood, metal, or composition according to the convenience and desire of the manufacturer and the buyer, the said body including a generally rectangular flat and elongated form provided with transversely spaced longitudinal grooves 6 opening through the right hand end of the body but extending only to the depths indicated by the numerals 7 and 8 in Figure 2. The grooves are arranged on opposite sides of the body and are vertically aligned in pairs, and each pair has at the right hand end of the block a vertical communicating slot 9.

A compressible material strip generally designated 10 is secured at one end as indicated by the numeral 11 to the side of the body and then brought under the body and then up through the adjacent vertical slot 9, then over the top of the block and down through the next adjacent vertical slot 9, thus, in turn, passing through all of the vertical slots 9 and terminating at the opposite side or edge of the block and being secured in place by other securing means 12 as clearly shown in Figure 3. Rubber is the preferred material for the strip 10.

The left hand ends of the various grooves 6 terminate at points indicated by the numerals 13, short of the left hand end of the block, and at a point slightly to the left of the point 13 and designated 14 there is provided a transverse horizontal slot 15 which opens through the left hand end of the body and has the edges of the furcations thereof provided with small notches 16 which are longitudinally aligned with the grooves 6.

The slot 15 provides a protective chamber for receiving the barbed points of the fish hook 17 while the crook of the fish hook is seated in the corresponding one of the notches 16 as indicated in Figure 1, with the shank of the hook overlying the top or the bottom, as the case may be, of the body 5, and the gut leader 18 of the hook lying along and in the corresponding slot 6 and the right hand end of the leader is disposed between the side of the corresponding vertical slot 9 and the part of the compressible strip 10 which lies therewithin.

By means of this disposition of the hook and its gut leader, the hook is held firmly in place with its barb protected and prevented from coming into contact with objects other than the slot 15 of the device, the gut leader is stretched in a straight line and held in a straight condition by the tension thereof as well as by the particular groove or slot 6 in which it lies, and the tie-end of the gut leader is clamped in the vertical slot 9, while the said tie-end extends therebeyond to be easily grasped by the fisherman and pulled out of the slot 9. When the tie-end of the gut leader is pulled out of the slot in which it is arranged, the entire hook assembly comes loose from the body 5 ready for application to the fishing line. In placing a fish hook on the device of the invention the barbed end of the hook is engaged with one of the notches 16 and then the leader is simply trained along the corresponding groove 6 and the tying end pressed down into the appropriate vertical slot 9, wherein it is held by the tension of the rubber or other compressible material strip 10. It will be observed that the strip 10 is of approximately the same width as the length of the slots 9.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A device for holding a fish hook, said device comprising a block provided with a longitudinal groove in one side, a transverse slot in one end of the body arranged to receive the barbed portion of the hook while said groove receives the shank or leader portion of the hook, and a vertical slot at the opposite end of the block communicating with the adjacent end of said groove, said vertical slot being arranged to receive the leader.

2. A device for holding a fish hook, said device comprising a block provided with a longitudinal groove in one side, a transverse slot in one end of the body arranged to receive the barbed portion of the hook while said groove receives the shank or leader portion of the hook, and a vertical slot at the opposite end of the block communicating with the adjacent end of said groove, said vertical slot being arranged to receive the leader, and clamping means in said vertical slot and acting to retain the leader in said vertical slot.

3. A device of the character described comprising a flat block having a transverse recess in one end defining a barb receiving chamber, the edges of the furcations resulting from said transverse slot being formed with notches to receive the crook portion of the hook, longitudinal grooves in the opposite sides of said body and aligned with the corresponding notches and opening through the opposite end of the body, and vertical slots at said opposite end of the body and communicating with vertically aligned pairs of said grooves, said vertical slots being arranged to receive the leader of the hook, and compressible means in the vertical slots for clamping the leader in place therein.

4. A device for holding a fish hook including a point and a leader, said device comprising a plate along which said leader lies, longitudinal ribs projecting from said plate and on opposite sides of and confining said leader, means at one end of said ribs with which the point of the hook is engaged, and clamp means at the opposite end of said ribs for holding said leader in place.

5. A device for holding a fish hook including a point and a leader, said device comprising a plate along which said leader lies, longitudinal ribs projecting from said plate and on opposite sides of and confining said leader, means at one end of said ribs with which the point of the hook is engaged, and clamp means at the opposite end of said ribs for holding said leader in place, said ribs defining therebetween a longitudinal slot extending substantially through the said opposite end of said plate.

6. A device for holding a fish hook, said device comprising a block provided with a longitudinal groove in one side, a transverse slot in one end of the body arranged to receive the barbed portion of the hook while said groove receives the shank or leader portion of the hook, and a vertical slot at the opposite end of the block communicating with the adjacent end of said groove, said vertical slot being arranged to receive the leader, and a compressible body in said vertical slot, said compressible body being arranged to be compressed by insertion of the leader against the sides of said vertical slot whereby said leader is retained therein.

7. A device for holding fish hooks having points and leaders, said device comprising a block forms in one of its sides with longitudinal grooves, means on one end of said body for receiving the points of the hooks with the leaders lying in the grooves, a corresponding plurality of vertical slots in the opposite end of said block and aligned with said grooves and receiving the corresponding leaders, and a strip of compressible material passed transversely of said block and alternately downwardly and upwardly through said vertical slots to clamp the leaders in said vertical slots.

8. A device for holding fish hooks having points and leaders, said device comprising a block formed in one of its sides with longitudinal grooves, means on one end of said body for receiving the points of the hooks with the leaders lying in the grooves, a corresponding plurality of vertical slots in the opposite end of said block and aligned with said grooves and receiving the corresponding leaders, and a strip of compressible material passed transversely of said block and alternately downwardly and upwardly through said vertical slots to clamp the leaders in said vertical slots, and additional leader accommodating grooves on the opposite side of said block and aligned with said vertical slots.

TULLIO SQUASSONI.